(12) United States Patent
Kim et al.

(10) Patent No.: US 10,704,795 B2
(45) Date of Patent: Jul. 7, 2020

(54) BATHROOM MANAGEMENT SYSTEM

(71) Applicant: LG ELECTRONICS INC., Seoul (KR)

(72) Inventors: Jongseok Kim, Seoul (KR); Seongho Kim, Seoul (KR); Daeyun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 176 days.

(21) Appl. No.: 15/840,653

(22) Filed: Dec. 13, 2017

(65) Prior Publication Data

US 2018/0163983 A1 Jun. 14, 2018

(30) Foreign Application Priority Data

Dec. 13, 2016 (KR) .................. 10-2016-0169272

(51) Int. Cl.
| | | |
|---|---|---|
| F24F 11/00 | (2018.01) | |
| F24F 3/16 | (2006.01) | |
| A47K 10/06 | (2006.01) | |
| E03D 9/04 | (2006.01) | |
| A47K 10/10 | (2006.01) | |
| F24F 11/72 | (2018.01) | |

(Continued)

(52) U.S. Cl.
CPC .......... *F24F 11/0001* (2013.01); *A47K 10/06* (2013.01); *A47K 10/10* (2013.01); *E03D 9/04* (2013.01); *F24F 3/1603* (2013.01); *F24F 11/72* (2018.01); *F24F 11/56* (2018.01); *F24F 13/20* (2013.01); *F24F 2003/1664* (2013.01); *F24F 2003/1682* (2013.01); *F24F 2110/10* (2018.01); *F24F 2110/12* (2018.01); *F24F 2110/20* (2018.01); *F24F 2110/22* (2018.01); *F24F 2110/60* (2018.01); *F24F 2221/02* (2013.01)

(58) Field of Classification Search
CPC .... F24F 11/0001; F24F 11/76; F24F 2110/10; F24F 2110/12; F24F 2013/205; E03D 9/052; A47K 10/06
See application file for complete search history.

(56) References Cited

U.S. PATENT DOCUMENTS 4,550,770 A * 11/1985 Nussdorfer ............. F24F 1/027
165/242
4,953,784 A * 9/1990 Yasufuku ............. F24F 11/0001
236/44 A (Continued)

FOREIGN PATENT DOCUMENTS

FR 2906992 A1 * 4/2008 ............. A47K 10/06
JP 2002360653 A * 12/2002
(Continued)

*Primary Examiner* — Nelson J Nieves
(74) *Attorney, Agent, or Firm* — Ked & Associates, LLP

(57) ABSTRACT

The present disclosure relates to a bathroom management system for heating, sterilizing or deodorizing the inside of a bathroom according to the state of the inside or outside of bathroom. The bathroom managing system includes: a ventilation unit disposed in a bathroom to exhaust air inside the bathroom to the outside; a bathroom managing apparatus disposed inside the bathroom and heat, sterilize to deodorize the inside of bathroom; and a switch disposed outside the bathroom to control the ventilation unit and communicate with the bathroom managing apparatus.

18 Claims, 10 Drawing Sheets

(51) Int. Cl.
*F24F 110/60* (2018.01)
*F24F 110/20* (2018.01)
*F24F 110/10* (2018.01)
*F24F 11/56* (2018.01)
*F24F 13/20* (2006.01)
*F24F 110/22* (2018.01)
*F24F 110/12* (2018.01)

(56) References Cited

U.S. PATENT DOCUMENTS

| | | | | |
|---|---|---|---|---|
| 5,355,323 | A * | 10/1994 | Bae | F24F 3/1405 700/276 |
| 5,548,100 | A * | 8/1996 | Miller | A47K 10/06 219/385 |
| 6,153,862 | A * | 11/2000 | Job | A47K 10/06 219/385 |
| 6,935,570 | B2 * | 8/2005 | Acker, Jr. | F24F 11/0001 236/44 R |
| 7,325,748 | B2 * | 2/2008 | Acker, Jr. | F24F 11/0001 236/44 A |
| 2006/0051079 | A1 * | 3/2006 | Gerhardinger | A47K 10/06 392/435 |
| 2009/0140057 | A1 * | 6/2009 | Leen | G05D 23/1905 236/49.3 |
| 2010/0078492 | A1 * | 4/2010 | Cislo | F24F 7/06 236/49.3 |
| 2010/0078494 | A1 * | 4/2010 | Mularoni | F24F 11/0001 236/44 A |
| 2010/0198411 | A1 * | 8/2010 | Wolfson | G05B 15/02 700/275 |
| 2012/0080944 | A1 * | 4/2012 | Recker | H05B 33/0803 307/25 |
| 2013/0020397 | A1 * | 1/2013 | Branham | F24F 11/0001 236/44 A |
| 2014/0131459 | A1 * | 5/2014 | Dorendorf | F24F 11/0001 236/49.3 |
| 2015/0184884 | A1 * | 7/2015 | Aquino | F24F 11/0001 165/250 |
| 2015/0345819 | A1 * | 12/2015 | Ostrovsky | F24F 11/0008 236/44 A |
| 2018/0087789 | A1 * | 3/2018 | Nunez | F24F 7/013 |
| 2019/0120511 | A1 * | 4/2019 | Bucsa | F01D 1/22 |

FOREIGN PATENT DOCUMENTS

JP 2003106546 A * 4/2003
JP 2004211961 A * 7/2004

* cited by examiner

BATHROOM MANAGEMENT SYSTEM

CROSS-REFERENCE TO RELATED APPLICATION(S)

This application claims priority under 35 U.S.C. § 119 to Korean Application No. 10-2016-0169272 filed on Dec. 13, 2016, whose entire disclosure is hereby incorporated by reference.

BACKGROUND

1. Field

The present disclosure relates to a bathroom management system for ventilating and deodorizing a bathroom.

2. Background

Bathroom management systems for ventilating and deodorizing a bathroom are known. However, they suffer from various disadvantages.

BRIEF DESCRIPTION OF THE DRAWINGS

The embodiments will be described in detail with reference to the following drawings in which like reference numerals refer to like elements wherein.

DETAILED DESCRIPTION

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Hereinafter, the present disclosure will be described with reference to the drawings for explaining a bathroom management system according to embodiments of the present disclosure.

The present disclosure is directed to an improved bathroom management system for heating, sterilizing or deodorizing an inside of a bathroom according to a state inside and/or outside the bathroom.

Generally, a bathroom is a place for personal hygiene activities as well as to do the laundry, or other types of washing. Bathrooms may include one or more of a sink, shower, bathtub, toilet, and the like. In bathrooms, mold or germs may exist or bad smells may be generated due to generated moisture or odor.

Most bathrooms which are configured to be ventilated and deodorized use a ventilating fan. However, the ventilating fans in such bathrooms are not operated in view of both internal and external environments of the bathroom, but is operated manually by a user. Therefore, the operation of the ventilating fan is often not properly performed, and the conventional ventilating fan may not be suitable for keeping the whole bathroom dry. Accordingly, ventilation and deodorization are often not properly achieved.

Therefore, in addition to the ventilating fan, a separate bathroom managing apparatus for directly heating, sterilizing or deodorizing the bathroom is required. Moreover, the bathroom managing apparatus and the ventilating fan should be controlled in consideration of the internal and external environments associated with the bathroom.

Figure 1:
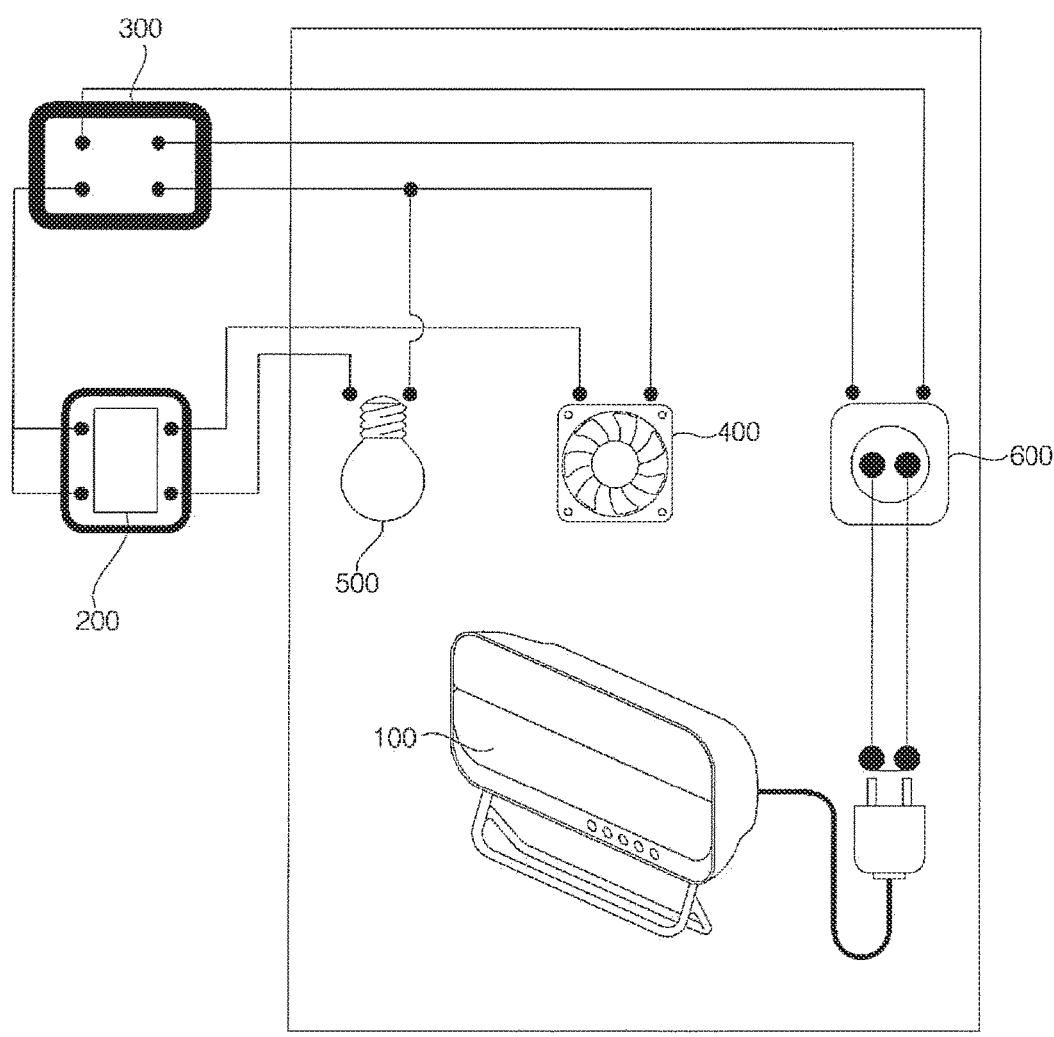
FIG. 1 is a block diagram illustrating a bathroom management system according to an embodiment of the present disclosure.

FIG. 1 is a block diagram illustrating a bathroom management system according to an embodiment of the present disclosure.

The bathroom management system according to an embodiment of the present disclosure may include a ventilation unit 400 which is disposed in a bathroom and exhausts air inside the bathroom to the outside, a bathroom lamp 500 which is disposed inside the bathroom and produces light, a bathroom managing apparatus 100 which is disposed inside the bathroom and heats, sterilizes and deodorizes the inside of the bathroom, a switch 200 which is disposed outside the bathroom, controls the ventilation unit 400 and the bathroom lamp 500, and communicates with the bathroom managing apparatus 100, and a distribution board 300 which supplies power to the ventilation unit 400, the bathroom lamp 500, and a plug socket 600.

The ventilation unit 400 may exhaust air inside the bathroom to the outside of the bathroom. The ventilation unit 400 may include a ventilation fan, a motor, a duct, and the like. The ventilation unit 400 may be disposed on a ceiling of the bathroom and may communicate with an exhaust duct. The operation of ventilation unit 400 may be controlled by the switch 200. The ventilation unit 400 may have one line of a power supply line connected to the distribution board 300 and the other line connected to the switch 200.

The bathroom lamp 500 may illuminate the inside of the bathroom by producing light. The bathroom lamp 500 may be disposed on the ceiling of the bathroom, on an upper portion of a wall, or another appropriate location based on desired lighting. The operation of bathroom lamp 500 may be controlled by the switch 200. The bathroom lamp 500 may have one line of a power supply line connected to the distribution board 300 and the other line connected to the switch 200.

The plug socket 600 may be disposed inside the bathroom. The plug socket 600 may accommodate connection of a plug of a home appliance to supply power. In the present embodiment, the plug socket 600 may be connected to a plug of the bathroom managing apparatus 100. The power supply line of the plug socket 600 may be connected to the distribution board 300. According to an embodiment, one power supply line of the plug socket 600 may be connected to the distribution board 300 and another line may be connected to the switch 200. In this case, the switch 200 may control the operation of the bathroom managing apparatus 100.

The distribution board 300 may distribute power to each device. The distribution board 300 may distribute the power supplied from a main power supply to the ventilation unit 400, the bathroom lamp 500, and the plug socket 600 which are disposed in the bathroom. The distribution panel 300 may be electrically connected to the ventilation unit 400, the bathroom lamp 500, and the plug socket 600.

The switch 200 may be disposed outside the bathroom. The switch 200 may control the ventilation unit 400, the bathroom lamp 500 and/or the bathroom managing apparatus 100 according to the user's operation or the environment inside or outside the bathroom. The switch 200 may be electrically connected to the ventilation unit 400 and the bathroom lamp 500. The switch 200 may perform wired or wireless communications with the bathroom managing apparatus 100. A detailed description of the switch 200 will be given later with reference to FIG. 2 and FIG. 3.

The bathroom managing apparatus 100 may be disposed inside the bathroom to heat, sterilize and deodorize the inside of the bathroom. The bathroom managing apparatus 100 may be connected to the plug socket 600 through a plug to receive power. The bathroom managing apparatus 100 may perform wired or wireless communications with the switch 200. A detailed description of the bathroom managing apparatus 100 will be given later with reference to FIG. 4 to FIG. 6.

Figure 2:
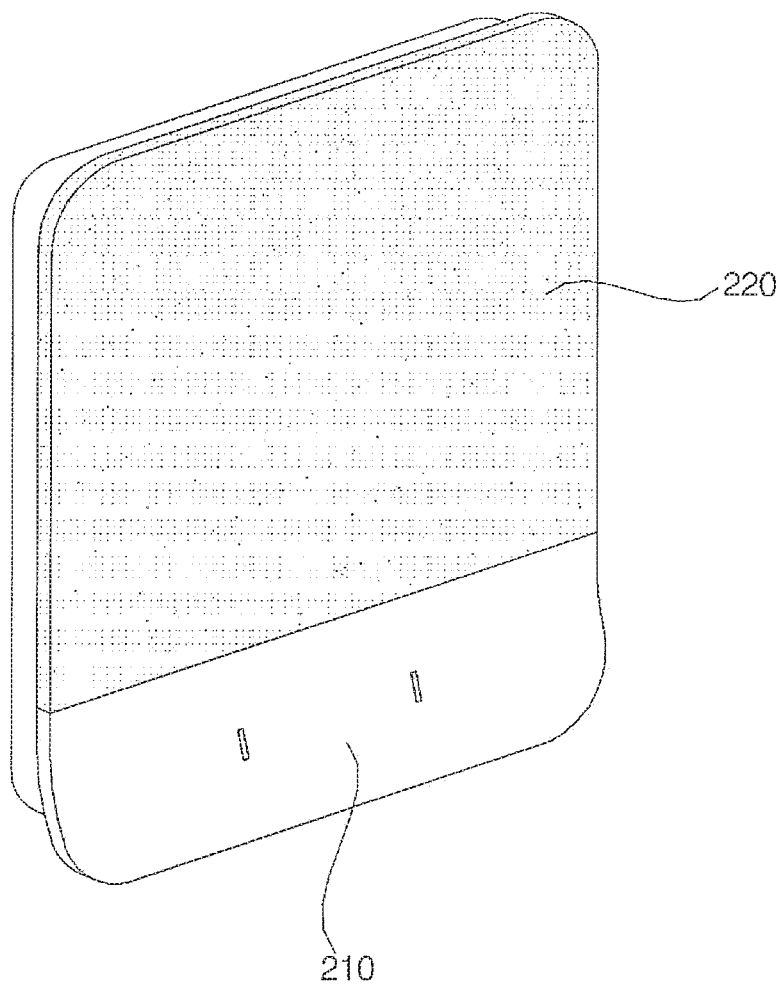
FIG. 2 is a perspective view of a switch according to an embodiment of the present disclosure.
Figure 3:
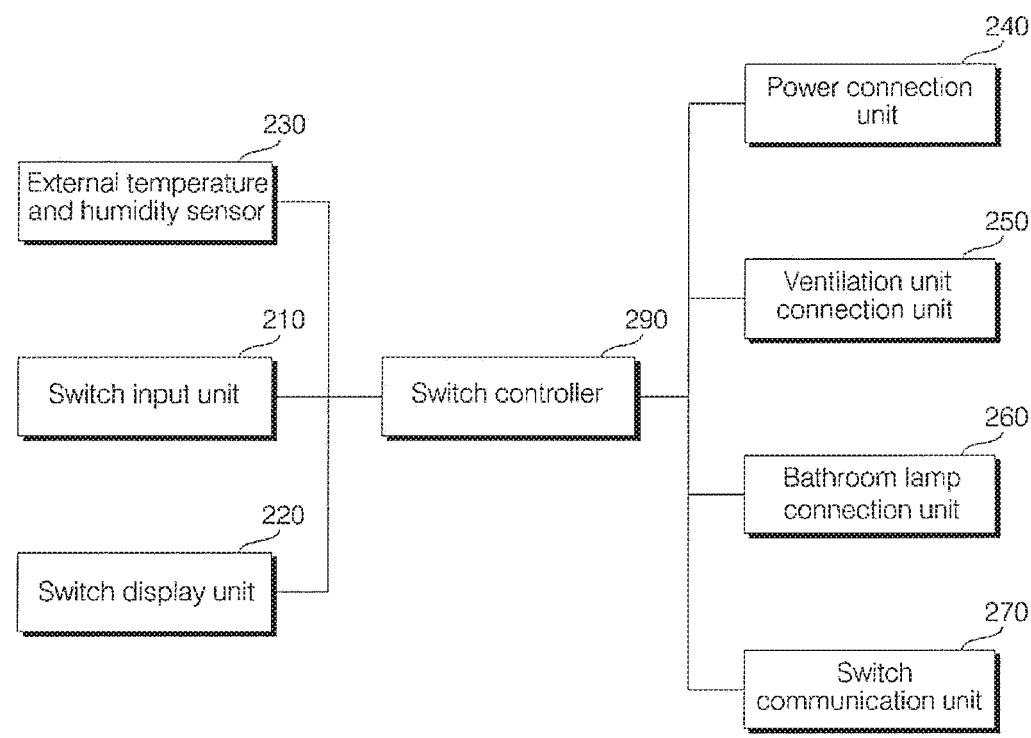
FIG. 3 is a block diagram of the switch shown in FIG. 2.

FIG. 2 is a perspective view of a switch according to an embodiment of the present disclosure, and FIG. 3 is a block diagram of the switch shown in FIG. 2. The switch 200 according to an embodiment of the present disclosure may include an external temperature and humidity sensor 230 which may measure temperature and relative humidity outside the bathroom, a switch input unit 210 which may receive a user input, a switch display unit 220 which may display various state information, a power connection unit 240 to which a power source may be connected, a ventilation unit connection unit 250 which may be electrically connected to the ventilation unit 400, a bathroom lamp connection unit 260 which may be electrically connected to the bathroom lamp 500, a switch communication unit 270 which may communicate with the bathroom managing apparatus 100, and a switch controller 290 which may control the ventilation unit connection unit 250, the bathroom lamp connection unit 260, and the switch communication unit 270 by receiving data or command from the external temperature and humidity sensor 230, the switch input unit 210, and the switch communication unit 270, and displays various information on the switch display unit 220.

The external temperature and humidity sensor 230 may measure the temperature and relative humidity outside the bathroom. An external temperature value of the bathroom, which is a temperature outside the bathroom, and an external humidity value of the bathroom, which is a relative humidity outside the bathroom, measured by the external temperature and humidity sensor 230, may be transmitted to the switch controller 290.

The switch input unit 210 may accept a command from the user to turn on/off the ventilation unit 400, turn on/off the bathroom lamp 500, and the like. The user may select information displayed on the switch display unit 220 through the switch input unit 210. The user may control the operation of the bathroom managing apparatus 100 through the switch input unit 210 according to an embodiment.

The switch display unit 220 may display at least one of the external temperature value of the bathroom and the external humidity value of the bathroom measured by the external temperature and humidity sensor 230, an internal temperature and relative humidity of the bathroom measured by the bathroom managing apparatus 100, an operation state of the ventilation unit 400, an operation state of the bathroom lamp 500, and an operation state of the bathroom managing apparatus 100.

The ventilation unit connection unit 250 may be connected to one of the power supply lines of the ventilation unit 400. The ventilation unit connection unit 250 may be energized by the power connection unit 240 according to an input of the switch input unit 210 to apply power to the ventilation unit 400. When power is applied to the ventilation unit 400, the ventilation unit 400 operates to ventilate the inside of the bathroom.

The bathroom lamp connection unit 260 may be connected to one of the power supply lines of the bathroom lamp 500. The bathroom lamp connection unit 260 may be energized by the power connection unit 240 according to the input of the switch input unit 210 to apply power to the bathroom lamp 500. When power is applied to the bathroom lamp 500, the bathroom lamp 500 may operate to illuminate the inside of the bathroom.

The switch communication unit 270 may communicate with the bathroom managing apparatus 100 via wired or wireless communication. In the present embodiment, it is preferable that the switch communication unit 270 wirelessly communicates with the bathroom managing apparatus 100 through wireless communication such as Wireless LAN (WLAN), Wi-Fi, 3G or 4G LTE, Bluetooth, Radio Frequency Identification (RFID), Infrared Data Association (IrDA), or the like.

The switch communication unit 270 may transmit the external temperature value related to the bathroom and the external humidity value related to the bathroom measured by the external temperature and humidity sensor 230, or a control command for the bathroom managing apparatus 100 to the bathroom managing apparatus 100, and may receive the internal temperature and relative humidity of the bathroom measured by the bathroom managing apparatus 100, or a control command for the ventilation unit 400 and the bathroom lamp 500.

The switch controller 290 may control the ventilation unit 400, the bathroom lamp 500 or the bathroom managing apparatus 100 to manage the inside of the bathroom according to temperature, relative humidity or gas inside and outside the bathroom. A detailed description thereof will be given later with reference to FIGS. 7 to 10.

Figure 4:
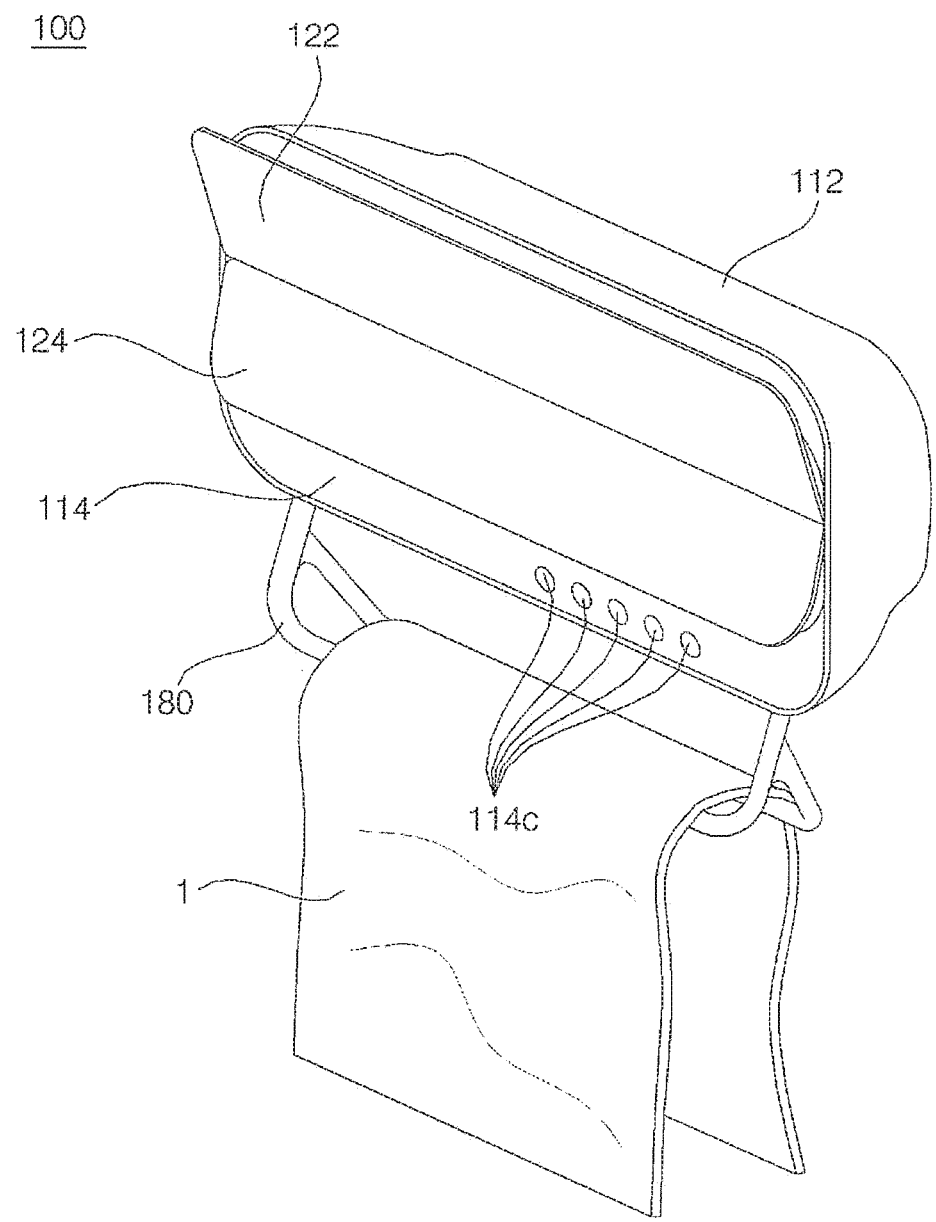
FIG. 4 is a perspective view of a bathroom managing apparatus according to an embodiment of the present disclosure.
Figure 5:
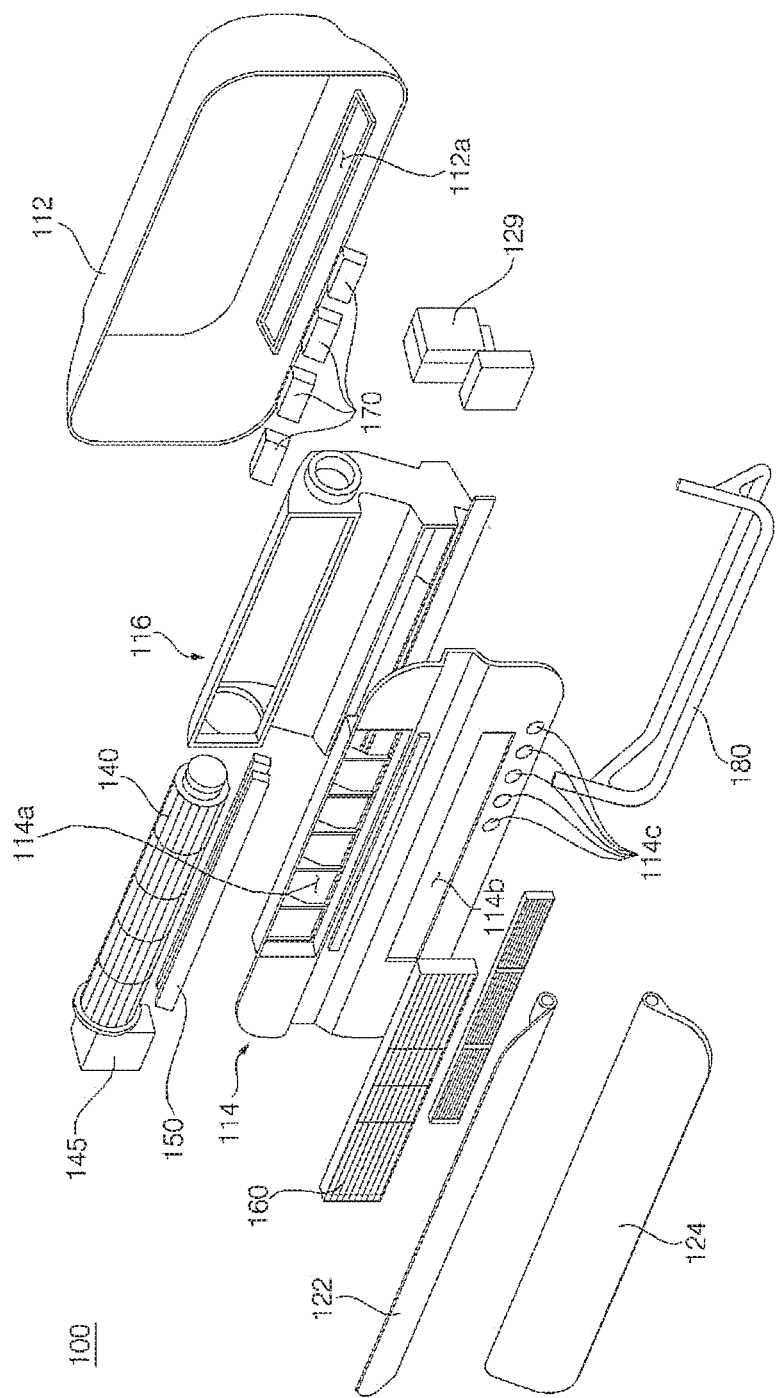
FIG. 5 is an exploded perspective view of the bathroom managing apparatus shown in FIG. 4.
Figure 6:
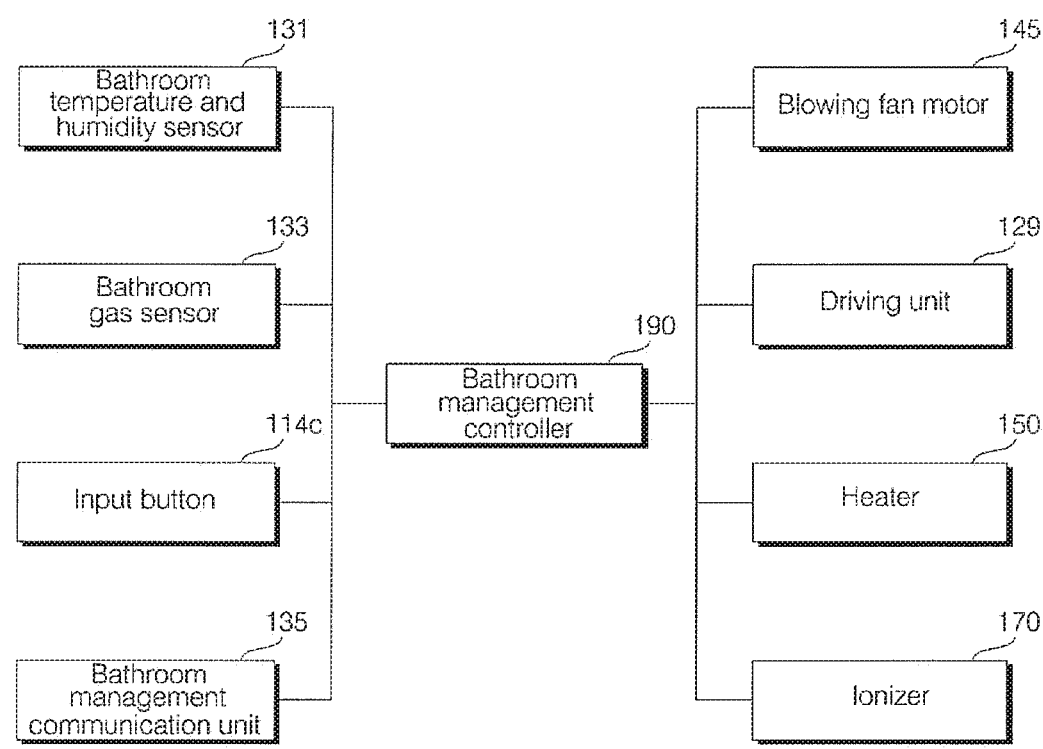
FIG. 6 is a block diagram of the bathroom managing apparatus shown in FIG. 4.

FIG. 4 is a perspective view of a bathroom managing apparatus according to an embodiment of the present disclosure, FIG. 5 is an exploded perspective view of the bathroom managing apparatus shown in FIG. 4, and FIG. 6 is a block diagram of the bathroom managing apparatus shown in FIG. 4.

The bathroom managing apparatus 100 according to an embodiment of the present disclosure may include a case 112 and 114 which forms an outer appearance. The bathroom management apparatus 100 may be provided with an air inlet 114a for air intake and an air outlet 114b for discharging air, a bathroom temperature and humidity sensor 131 which measures the temperature and relative humidity inside the bathroom, a bathroom gas sensor 133 which measures gas inside the bathroom, an input button 114c which receives a user's input, a blowing fan 140 which blows air, a blowing fan motor 145 which rotates the blowing fan 140, a suction vane 122 which opens and closes the air inlet 114*a* of the case 112 and 114, a discharge vane 124 which opens and closes the air outlet 114*b*, a driving unit 129 which opens and closes the suction vane 122 and the discharge vane 124, a heater 150 which heats the air discharged to the air outlet 114*b*, an ionizer 170 which generates ions for sterilization, and a bathroom management communication unit 135 which communicates with the switch 200.

The case 112 and 114 may form the appearance of the bathroom managing apparatus 100. The case 112 and 114 may include an outer case 112 that forms a side and rear appearance, and an inner case 114 that forms a front appearance. The air inlet 114*a* for air intake may be formed in the upper portion of the inner case 114, and the air outlet 114*b* for discharging air may be formed in the lower portion. A rack unit 180, on which a towel 1 or the like can be hanged, may be coupled to the lower surface of the outer case 112. Rack unit 180 may also be a towel bar, hook, or the like. An auxiliary discharge hole 112*a* for discharging air toward the towel 1 or the like hung on the rack unit 180 may be formed on a lower surface of the outer case 112. A duct 116 for guiding the air intake into the air inlet 114*a* to the air outlet 114*b* and the auxiliary discharge hole 112*a* may be provided between the outer case 112 and the inner case 114.

The suction vane 122 may be rotatably coupled to the upper portion of the inner case 114. The suction vane 122 may rotate to open and close the air inlet 114*a*. The discharge vane 124 may be rotatably coupled to the lower portion of the inner case 114. The discharge vane 124 may rotate to open and close the air outlet 114*b*. The suction vane 122 and the discharge vane 124 may be rotated by the driving unit 129. The driving unit 129 may be formed of one or two motors and a power transmission means and may rotate the suction vane 122 and the discharge vane 124. The various vanes including the suction vane and discharge vane may be referred to as a cover, door, flap, or the like.

The blowing fan 140 may intake air through the air inlet 114*a* and discharge the air to the air outlet 114*b*. The blowing fan 140 may be disposed in the upper portion of the duct 116. The blowing fan 140 may be a cross flow fan that intakes and discharges air in the radial direction. The blowing fan motor 145 may generate a rotating force to rotate the blowing fan 140. In one embodiment, the blowing fan 140 may include a centrifugal fan or rotary fan. The blowing fan 140 may include impellers or fan blades to move air based on the type of fan.

A deodorization filter 160 may be disposed in the inner case 114 to deodorize the air drawn into the air inlet 114*a*. The deodorization filter 160 may use a porous material such as charcoal as a deodorizer or may be configured by using an apatite which is an inorganic material to remove gaseous harmful substances in the air.

The heater 150 may be disposed in the duct 116 and configured to heat the air drawn into the air inlet 114*a* by the blowing fan 140. The air heated by the heater 150 may be discharged through the air outlet 114*b*.

The ionizer 170 may generate ions and discharge them together with air discharged to the air outlet 114*b*. The ions generated in the ionizer 170 and discharged through the air outlet 114*b* may sterilize to destroy microorganisms and germs in the bathroom and inhibit the growth of mold.

The bathroom temperature and humidity sensor 131 may measure the temperature and relative humidity inside the bathroom. An internal temperature value of the bathroom which is the temperature inside the bathroom, and an internal humidity value of the bathroom which is the relative humidity inside the bathroom, that are measured by the bathroom temperature and humidity sensor 131, may be transmitted to a bathroom management controller 190.

The bathroom gas sensor 133 may measure an amount and/or type of gas inside the bathroom. Various types of gas sensors may be used for the bathroom gas sensor 133, and in the present embodiment, the bathroom gas sensor may be a semiconductor gas sensor that reacts even to strong reducing gases, such as a lox or the like. A bathroom gas value, which is the gas inside the bathroom measured by the bathroom gas sensor 133, may be transmitted to the bathroom management controller 190.

The input button 114*c* may accept a control command for the bathroom managing apparatus 100 from a user. The user's command input by the input button 114*c* may be transmitted to the bathroom management controller 190.

The bathroom management communication unit 135 may perform wired or wireless communications with the switch communication unit 270 of the switch 200. The bathroom management communication unit 135 may wirelessly communicate with the switch communication unit 270 through wirelessly communication such as Wiresmaller LAN (WLAN), Wi-Fi, 3G or 4G LTE, Bluetooth, Radio Frequency Identification (RFID), Infrared Data Association (IrDA), or the like.

The bathroom management communication unit 135 may transmit the internal temperature value of the bathroom and the internal humidity value of the bathroom measured by the bathroom temperature and humidity sensor 131, or a control command for the ventilating unit 400 and the bathroom lamp 500 to the switch communication unit 270. In addition, the bathroom management communication unit 135 may receive the external temperature value of the bathroom and the external humidity value of the bathroom measured by the switch 200, the operation state of the ventilation unit 400 and the bathroom lamp 500, and a control command for the bathroom managing apparatus 100 from the switch communication unit 270.

The bathroom management controller 190 may control the bathroom managing apparatus 100, the ventilation unit 400, or the bathroom lamp 500 to manage the inside of the bathroom according to temperature, relative humidity, or gas inside and outside the bathroom. The bathroom management controller 190 may perform an internal bathroom management of the bathroom together with the switch controller 290 described above. A detailed description thereof will be given later with reference to FIGS. 7 to 10.

Figure 7:
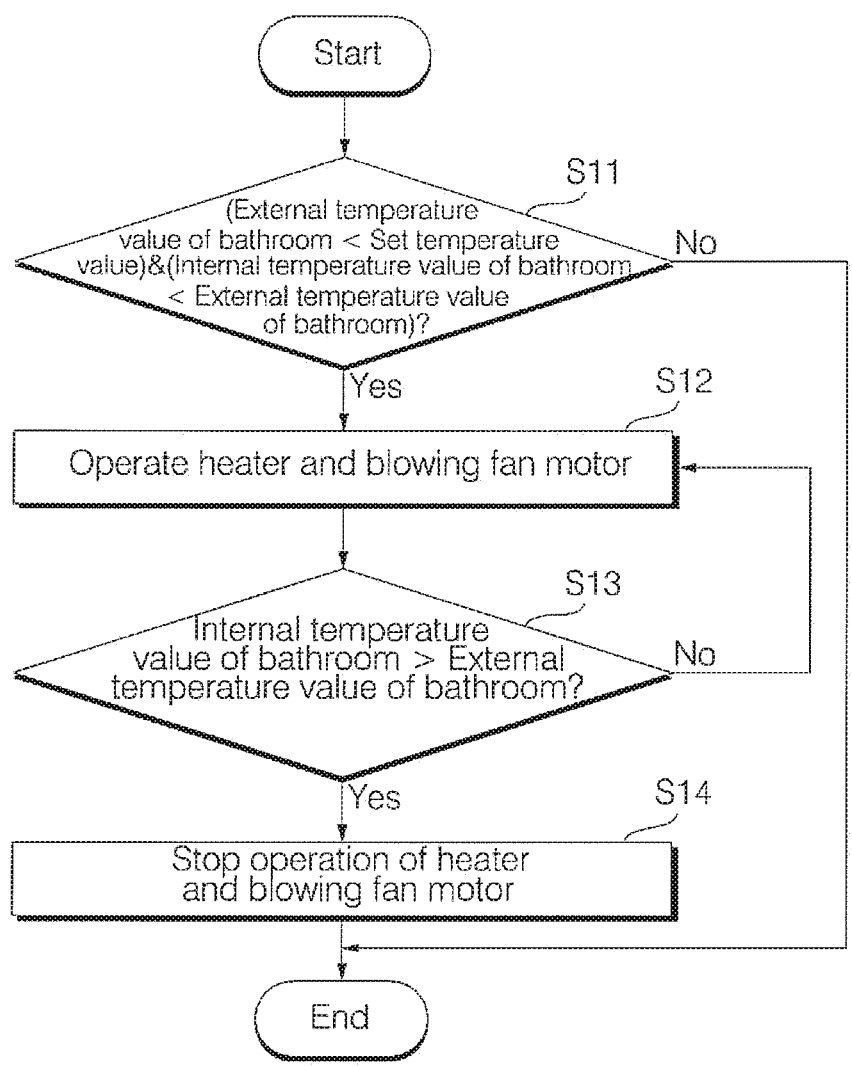
FIG. 7 is a flowchart illustrating a control method for a bathroom management system according to an embodiment of the present disclosure.

FIG. 7 is a flowchart illustrating a control method for a bathroom management system according to an embodiment of the present disclosure. It may be determined whether the external temperature value of the bathroom measured by the external temperature and humidity sensor 230 of the switch 200 is less than a set temperature value and the internal temperature value of the bathroom measured by the bathroom temperature and humidity sensor 131 of the bathroom managing apparatus 100 is less than an external temperature value of the bathroom (S11). The bathroom management controller 190 may receive the external temperature value of the bathroom measured by the external temperature and humidity sensor 230 through the switch communication unit 270 and the bathroom management communication unit 135, and compare the received external temperature value of the bathroom with a previously set temperature value and the internal temperature value of the bathroom measured by the bathroom temperature and humidity sensor 131. The set temperature value may be about room temperature. In the present embodiment, the set temperature value may be 20 degrees Celsius (or 68° F.).

When the external temperature value of the bathroom is less than the set temperature value and the internal temperature of the bathroom is less than the external temperature of the bathroom, the heater 150 and the blowing fan motor 145 of the bathroom managing apparatus 100 may be operated to heat the inside of the bathroom (S12). If the external temperature value of the bathroom is less than the set temperature value, it is usually winter. Further, if the internal temperature of the bathroom is less than the external temperature of the bathroom, the user of the bathroom may feel cold when using the bathroom. Therefore, the bathroom managing apparatus 100 may heat the inside of the bathroom.

The bathroom management controller 190 may operate the heater 150 and operate the blowing fan motor 145 when the external temperature value of the bathroom is less than the set temperature value and the internal temperature value of the bathroom is smaller than the external temperature value of the bathroom. The bathroom management controller 190 may operate the driving unit 129 to open the air inlet 114a and the air outlet 114b by rotating the suction vane 122 and the discharge vane 124.

When the blowing fan motor 145 is operated, the blowing fan 140 may rotate so that air is drawn in through the air inlet 114a of the bathroom managing apparatus 100, heated by the heater 150, and discharged through the air outlet 114b. The bathroom managing apparatus 100 may discharge the heated air by the operation of the heater 150 and the blowing fan motor 145 to heat the inside of the bathroom.

It may be determined whether the internal temperature value of the bathroom is greater than the external temperature value of the bathroom (S13). When a set time elapses after the heater 150 and the blowing fan motor 145 are operated, the bathroom management controller 190 may receive the external temperature value of the bathroom measured by the external temperature and humidity sensor 230 of the switch 200 through the switch communication unit 270 and the bathroom management communication unit 135, and receive the internal temperature value of the bathroom measured by the bathroom temperature and humidity sensor 131 to compare the external temperature value of the bathroom with the internal temperature value of the bathroom.

When the internal temperature of the bathroom is less than the external temperature of the bathroom, the bathroom management controller 190 may continue to operate the heater 150 and the blowing fan motor 145 (S12). When the internal temperature of the bathroom is less than the external temperature of the bathroom, the inside of the bathroom may not be sufficiently heated yet. Thus, the bathroom management controller 190 may continue to heat the inside of the bathroom.

When the internal temperature of the bathroom is greater than the external temperature of the bathroom, the operation of the heater 150 and the blowing fan motor 145 may be stopped to stop heating the inside of the bathroom (S14). When the internal temperature of the bathroom is greater than the external temperature of the bathroom, the inside of the bathroom may be sufficiently heated. Thus, the bathroom management controller 190 may stop the operation of the heater 150 and the blowing fan motor 145. The bathroom management controller 190 may operate the driving unit 129 to close the air inlet 114a and the air outlet 114b by rotating the suction vane 122 and the discharge vane 124.

Figure 8:
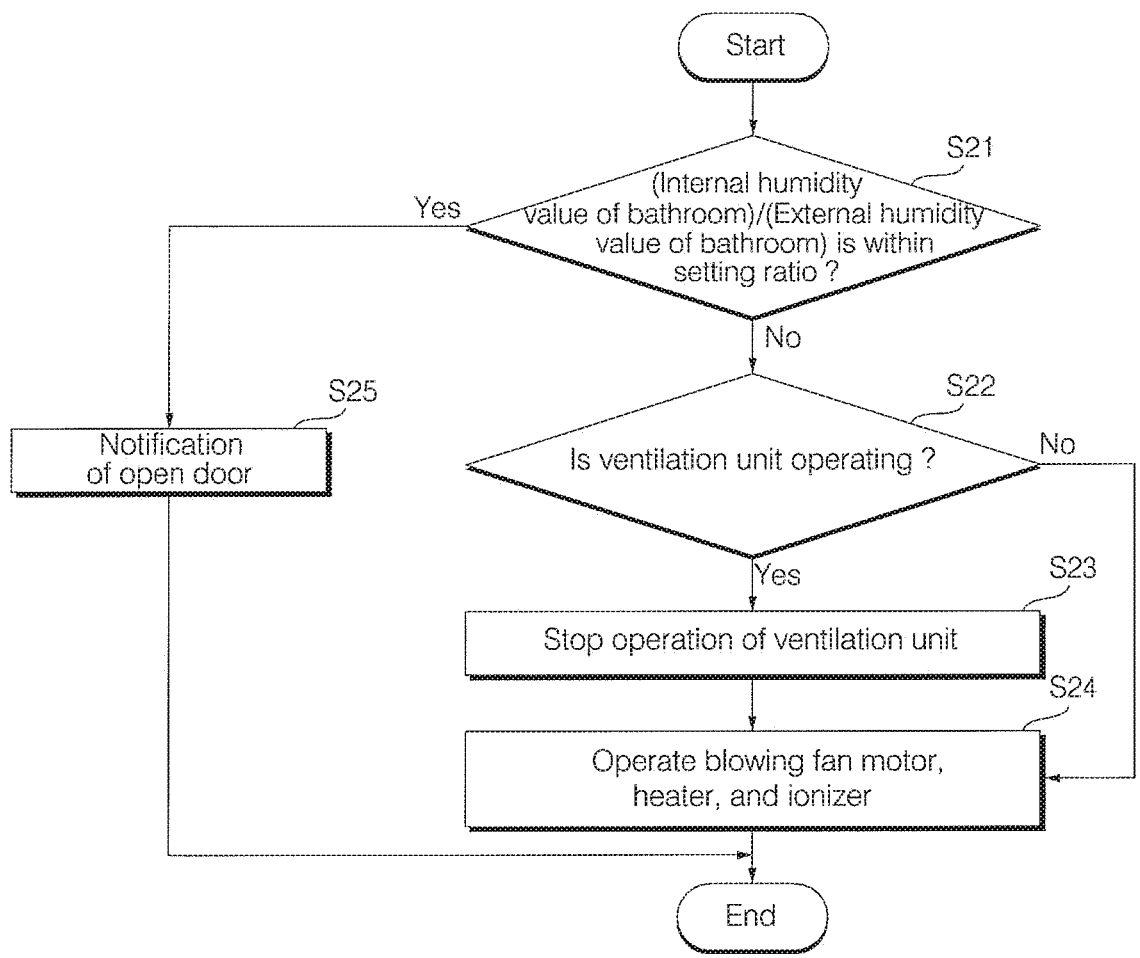
FIG. 8 is a flowchart illustrating a control method for a bathroom management system according to another embodiment of the present disclosure.

FIG. 8 is a flowchart illustrating a control method for a bathroom management system according to one embodiment of the present disclosure. A user may set, through the input button 114c, a bathroom management mode for automatically managing the inside of the bathroom by the bathroom managing apparatus 100. The bathroom managing apparatus 100 may automatically sterilize and dry the inside of the bathroom when the bathroom management mode is set.

The internal humidity value and an external humidity value for the bathroom may be measured and used for determining whether conditions for operating in the automatic bathroom management mode is possible.

It may be determined whether a ratio of the internal humidity value of the bathroom (measured by the bathroom temperature and humidity sensor 131 of the bathroom managing apparatus 100) to an external humidity value of the bathroom (measured by the external temperature and humidity sensor 230 of the switch 200) is within a setting ratio (S21). The setting ratio may be an acceptable range of difference between the internal and external humidity values.

The bathroom management controller 190 may receive the external humidity value of the bathroom measured by the external temperature and humidity sensor 230 through the switch communication unit 270 and the bathroom management communication unit 135, receive the internal humidity value of the bathroom measured by the bathroom temperature and humidity sensor 131, and calculate the ratio of the internal humidity value of the bathroom to the external humidity value of the bathroom to compare with a preset setting ratio. In the present embodiment, preferably, the setting ratio is 5%. That is, in the present embodiment, the bathroom management controller 190 may determine whether the following condition is satisfied:

$$0.95 < (\text{Internal humidity value of bathroom})/(\text{External humidity value of bathroom}) < 1.05$$

The ratio of the internal humidity value to the external humidity value may indicate whether a bathroom door for entering the bathroom is open. When the bathroom door is open, it may not be possible to sufficiently sterilize and dry the inside of the bathroom using the bathroom managing apparatus 100. Accordingly, the bathroom management controller 190 may determine whether the bathroom door is open through the ratio of the internal humidity value to the external humidity value.

When the ratio of the internal humidity value of the bathroom to the external humidity value of the bathroom is not within the setting ratio (e.g., door is not open), it is determined whether the ventilation unit 400 is operating (S22). The bathroom management controller 190 may receive the determination result of the operation of the ventilation unit 400 through the switch communication unit 270 and the bathroom management communication unit 135 to determine whether the ventilation unit 400 is in operation.

For example, while the ventilation unit 400 is in operation, the bathroom managing apparatus may not be able to effectively sterilize and dry the inside of the bathroom since it is not desirable to vent air from the heater and ionizer. Accordingly, the bathroom management controller 190 may determine whether the ventilation unit 400 is in operation.

When the ventilation unit 400 is operating, the operation of the ventilation unit 400 may be stopped (S23). When the ventilation unit 400 is operating, the bathroom management controller 190 may transmit an operation stop command for the ventilation unit 400 to the switch controller 290 via the bathroom management communication unit 135 and the switch communication unit 270, and the controller 290 may stop the operation of the ventilation unit 400.

When the ventilation unit 400 is not operating or the operation of the ventilation unit 400 is stopped, the blowing fan motor 145, the heater 150, and the ionizer 170 of the bathroom managing apparatus 100 may be operated to heat and sterilize the inside of the bathroom (S24). That is, when the ratio of the internal humidity value of the bathroom to the external humidity value of the bathroom is not within the setting ratio, and the ventilation unit 400 is not operating, it may satisfy the conditions for the automatic bathroom management. Accordingly, the bathroom managing apparatus 100 may heat and sterilize the inside of the bathroom.

Here, the bathroom management controller 190 may operate the blowing fan motor 145 to rotate the blowing fan 140, operate the heater 150 to heat the discharged air, and operate the ionizer 170 to discharge ions. The bathroom management controller 190 may operate the driving unit 129 to open the air inlet 114a and the air outlet 114b by rotating the suction vane 122 and the discharge vane 124.

As the blowing fan motor 145, the heater 150, and the ionizer 170 operate, the bathroom managing apparatus 100 may discharge the heated air to heat the inside of the bathroom and discharge ions to sterilize the inside of the bathroom. The bathroom managing apparatus 100 may operate the blowing fan motor 145, the heater 150, and the ionizer 170 for a set period of time. When the set period of time has elapsed, the bathroom management controller 190 may stop the operation of the heater 150, the blowing fan motor 145, and the ionizer 170.

On the other hand, when the ratio of the internal humidity value of the bathroom to the external humidity value of the bathroom is within the setting ratio, a notification may be generated that the bathroom door may be open (S25). When the ratio of the internal humidity value of the bathroom to the external humidity value of the bathroom is within the setting ratio, the bathroom management controller 190 may determine the bathroom door to be open. The bathroom management controller 190 may notify the switch controller 290 that the bathroom door is open through the bathroom management communication unit 135 and the switch communication unit 270. The switch controller 290 may display, through the switch display unit 220, that the bathroom door is open or a notification to check the door. The switch controller 290 may display, through the switch display unit 220, an indication that the bathroom door may be open and that the bathroom management by the bathroom managing apparatus 100 cannot be performed. According to an embodiment, the switch controller 290 may inform the user that the bathroom door is open through sound.

Figure 9:
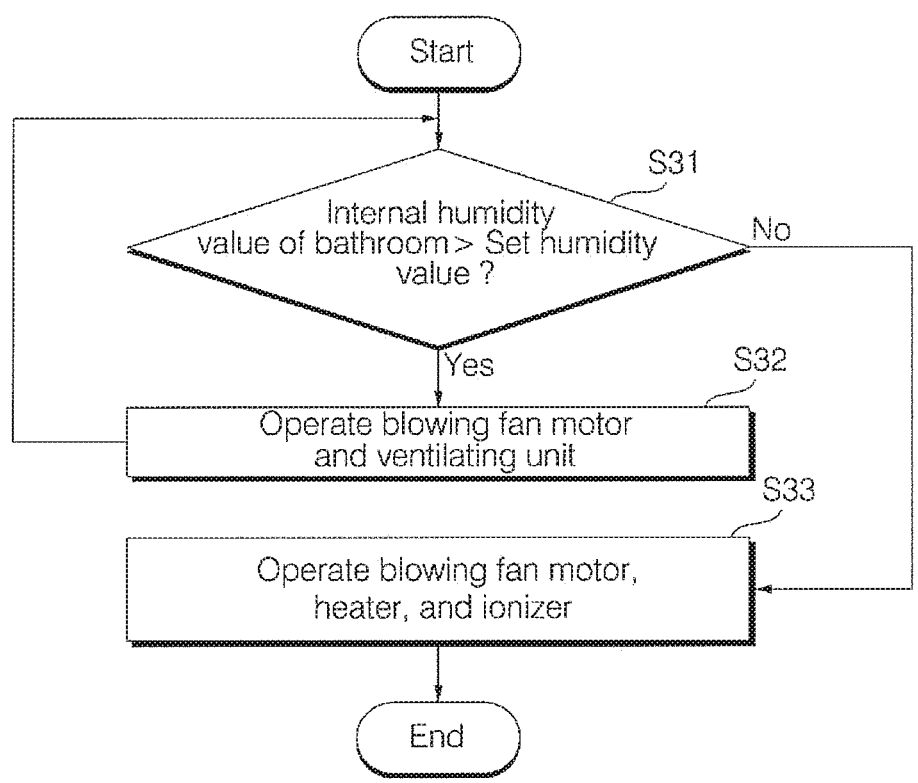
FIG. 9 is a flowchart illustrating a control method for a bathroom management system according to another embodiment of the present disclosure.

FIG. 9 is a flowchart illustrating a control method for a bathroom management system according to one embodiment of the present disclosure. A user may set, through the input button 114c, a bathroom sterilization mode in which the bathroom managing apparatus 100 automatically sterilizes the inside of the bathroom.

It may be determined whether the internal humidity value of the bathroom measured by the bathroom temperature and humidity sensor 131 of the bathroom managing apparatus 100 is greater than a set humidity value (S31). The bathroom management controller 190 may receive the internal humidity value of the bathroom measured by the bathroom temperature and humidity sensor 131 and compare it with a preset humidity value. When the internal humidity value of the bathroom is high, sufficient or effective sterilization of the inside of the bathroom may be difficult. Therefore, the bathroom management controller 190 may determine whether the internal humidity value of the bathroom is greater than the set humidity value.

When the internal humidity value of the bathroom is greater than the set humidity value, the ventilating unit 400 may be operated and the blowing fan motor 145 of the bathroom managing apparatus 100 may be operated to expel the air inside the bathroom (S32). The bathroom management controller 190 may transmit an operation command for the ventilation unit 400 to the switch controller 290 through the bathroom management communication unit 135 and the switch communication unit 270, and the switch controller 290 may operate the ventilation unit 400.

In addition, the bathroom management controller 190 may operate the blowing fan motor 145 to rotate the blowing fan 140 to circulate the air inside the bathroom. The bathroom management controller 190 may operate the driving unit 129 to open the air inlet 114a and the air outlet 114b by rotating the suction vane 122 and the discharge vane 124. The relative humidity inside the bathroom may be lowered by the operation of the ventilation unit 400 and the rotation of the blowing fan 140.

After operating the ventilation unit 400 and the blowing fan motor 145 for a set period of time, the bathroom management controller 190 may receive the internal humidity value of the bathroom measured by the bathroom temperature and humidity sensor 131, and determine again whether the internal humidity value of the bathroom is greater than the set humidity value (S31).

When the internal humidity value of the bathroom is less than the set humidity value, the blowing fan motor 145, and the ionizer 170 of the bathroom managing apparatus 100 may be operated to sterilize the inside of the bathroom (S33). The ventilation unit 400 may be stopped. The heater 150 may also be operated.

When the internal humidity value of the bathroom is less than the set humidity value, it satisfies the condition for automatic bathroom sterilization, and the bathroom managing apparatus 100 may sterilize the inside of the bathroom.

The bathroom management controller 190 may operate the blowing fan motor 145 to rotate the blowing fan 140, and operate the ionizer 170 to discharge ions. The bathroom management controller 190 may operate the driving unit 129 to open the air inlet 114a and the air outlet 114b by rotating the suction vane 122 and the discharge vane 124. As the blowing fan motor 145 and the ionizer 170 operate, the bathroom managing apparatus 100 may discharge ions to sterilize the inside of the bathroom.

To control the ventilation unit 400, the bathroom management controller 190 may transmit an operation command of the ventilation unit 400 to the switch controller 290 through the bathroom management communication unit 135 and the switch communication unit 270, and the switch controller 290 may operate the ventilation unit 400.

The bathroom managing apparatus 100 may operate the blowing fan motor 145, the heater 150 and the ionizer 170 for a set period of time. When the set time period has elapsed, the bathroom management controller 190 may stop the operation of the blowing fan motor 145, the heater 150 and the ionizer 170.

Figure 10:
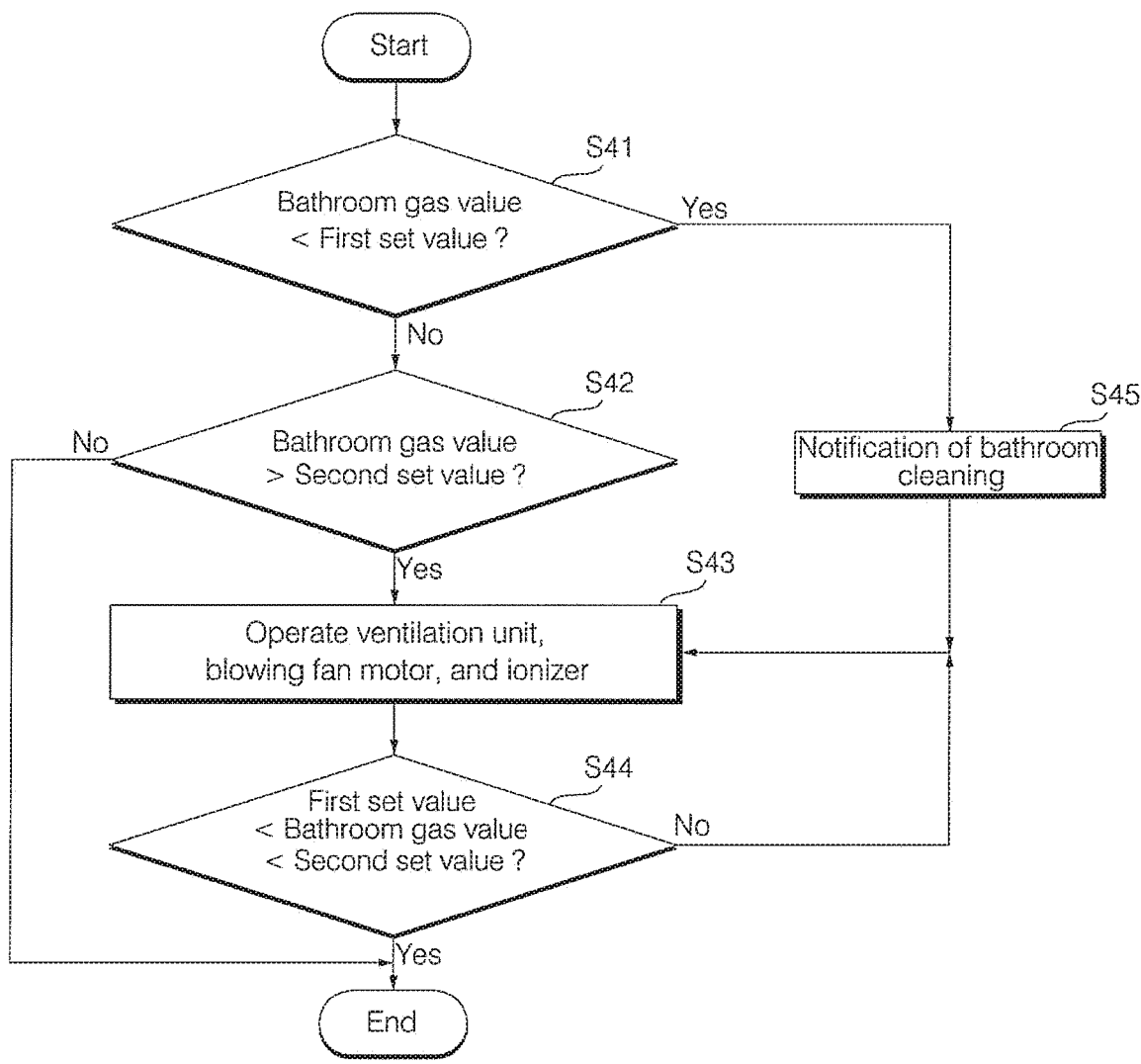
FIG. 10 is a flowchart illustrating a control method for a bathroom management system according to another embodiment of the present disclosure.

FIG. 10 is a flowchart illustrating a control method for a bathroom management system according to one embodiment of the present disclosure. A user may set, through the input button 114c, a bathroom deodorizing mode in which the bathroom managing apparatus 100 automatically deodorizes the inside of the bathroom.

It may be determined whether a bathroom gas value measured by the bathroom gas sensor 133 is less than a first set value (S41). The bathroom management controller 190 may receive the bathroom gas value measured by the bathroom gas sensor 133 and compare it with a preset first set value. For example, when the bathroom gas sensor 133 reacts to lox used for cleaning the bathroom, the bathroom gas value measured by the bathroom gas sensor 133 may be very low. Hence, the first set value may correspond to a maximum value of the measured bathroom gas value when lox is used in the bathroom. When the bathroom gas value is less than the first set value, the bathroom management controller 190 may determine that the bathroom has been cleaned using lox.

When the bathroom gas value is greater than the first set value, it is determined whether the bathroom gas value is greater than a second set value (S42). The bathroom management controller 190 may receive the bathroom gas value measured by the bathroom gas sensor 133 and compare it with a preset second set value. For example, when a user defecates in the bathroom, the bathroom gas value measured by the bathroom gas sensor 133 may be high and the second set value may correspond to a minimum value of the bathroom gas value measured when the user defecates.

When the bathroom gas value is greater than the second set value, the ventilation unit 400 may be operated and the blowing fan motor 145 and the ionizer 170 of the bathroom managing apparatus 100 may be operated to deodorize and sterilize the inside of the bathroom (S43). When the bathroom gas value is greater than the second set value, the bathroom management controller 190 may determine that the user has defecated. The bathroom management controller 190 may transmit an operation command of the ventilation unit 400 to the switch controller 290 through the bathroom management communication unit 135 and the switch communication unit 270, and the switch controller 290 may operate the ventilation unit 400. The bathroom management controller 190 may operate the blowing fan motor 145 to rotate the blowing fan 140, and operate the ionizer 170 to discharge ions. The bathroom management controller 190 may operate the driving unit 129 to open the air inlet 114*a* and the air outlet 114*b* by rotating the suction vane 122 and the discharge vane 124.

The air inside the bathroom may be discharged to the outside by the operation of the ventilation unit 400. The air drawn into the air inlet 114*a* may be deodorized by the deodorization filter 160 and then discharged through the air outlet 114*b* as the blowing fan 140 rotates. Due to the operation of the ionizer 170, the bathroom managing apparatus 100 may discharge ions to sterilize the inside of the bathroom.

The ventilation unit 400, the blowing fan motor 145 and the ionizer 170 may be controlled to stop operation after being operated for a preset amount of time. That is, after the set time period has elapsed, the bathroom management controller 190 may automatically stop the operation of the ventilation unit 400, the blowing fan motor 145, and the ionizer 170, and operate the driving unit 129 to close the air inlet 114*a* and the air outlet 114*b* by rotating the suction vane 122 and the discharge vane 124.

After the ventilation unit 400, the blowing fan motor 145, and the ionizer 170 are operated for a preset amount of time, it may be determined whether the bathroom gas value is between the first set value and the second set value (S44). The bathroom management controller 190 may receive the bathroom gas value measured by the bathroom gas sensor 133 and compare it with the first set value and the second set value. When the bathroom gas value measured by the bathroom gas sensor 133 is between the first set value and the second set value, the air inside the bathroom may be considered to be in a normal or acceptable state. Thus, the bathroom gas sensor 133 may compare the bathroom gas value with the first set value and the second set value to determine whether the deodorization is completed. In one embodiment, the first and second set value may be set by the user to adjust sensitivity of gas detection and deodorization operation.

When the bathroom gas value is between the first set value and the second set value, the bathroom deodorization may be terminated. When the bathroom gas value is not between the first set value and the second set value, the bathroom management controller 190 may operate the ventilation unit 400, the blowing fan motor 145, and the ionizer 170 again for a set time period (S43).

When the bathroom gas value is less than the first set value, a notification may be generated to indicate that the bathroom cleaning has been performed (S45). When the bathroom gas value is less than the first set value, the bathroom management controller 190 may determine that the bathroom cleaning is performed using lox, and inform the switch control unit 290 that the bathroom cleaning is performed, through the bathroom management communication unit 135 and the switch communication unit 270. The switch controller 290 may display, through the switch display unit 220, a notification that the bathroom cleaning is performed.

When it is determined that the bathroom cleaning is performed, the bathroom management controller 190 may store a bathroom cleaning performance record (or log). The bathroom management controller 190 may notify a user of a bathroom cleaning performance cycle through the switch display unit 220 of the switch controller 290 by storing the bathroom cleaning performance record. If the bathroom cleaning has not been performed for a long period of time, the bathroom management controller 190 may indicate to the user to perform bathroom cleaning through the switch display unit 220 of the switch controller 290. Here, notification settings may be set by the user.

After informing that the bathroom cleaning is performed, the ventilating unit 400, the blowing fan motor 145, and the ionizer 170 may be operated for a set period of time to deodorize and sterilize the inside of the bathroom (S44).

The bathroom management system of the present disclosure has one or more of the following effects.

First, the switch for controlling the ventilation unit and the bathroom managing apparatus for heating, sterilizing and deodorizing the inside of the bathroom can be associated with each other to automatically manage the inside of the bathroom. Particularly, the bathroom managing apparatus can monitor the inside state of the bathroom and the switch can monitor the outside state of the bathroom so that the ventilation unit and the bathroom managing apparatus can be automatically controlled by integrating the respectively measured state information, thereby achieving the bathroom management properly.

Second, it can be determined, from the external temperature of the bathroom and the internal temperature of the bathroom, whether it is winter and the internal temperature of the bathroom is low. In particular, when the internal temperature of the bathroom is low during winter, the bathroom managing apparatus can automatically heat the inside of the bathroom, thereby preventing the user from feeling cold when using the bathroom. In addition, the inside of the bathroom can be heated until the external temperature of the bathroom is equal to the internal temperature of the bathroom or a user set temperature to avoid excessive energy consumption.

Third, it can be determined, from the external relative humidity of the bathroom and the internal relative humidity of the bathroom, whether the bathroom door is opened. In addition, the bathroom managing apparatus can automatically heat and sterilize the inside of the bathroom while the bathroom door is closed and the ventilation unit is not operated, thereby efficiently drying and sterilizing the bathroom.

Fourth, when the internal relative humidity of the bathroom is high, sterilization of the inside of the bathroom is not performed sufficiently. Therefore, the bathroom managing apparatus automatically sterilizes the inside of the bathroom according to the internal relative humidity of the bathroom, thereby efficiently sterilizing the bathroom. In addition, when the internal relative humidity of the bathroom is high, the exhaust of the ventilation unit and the blowing of the bathroom management can be performed to lower the relative humidity inside the bathroom.

Fifth, it is possible to determine whether the inside of the bathroom has been cleaned using lox or the user has defecated, according to the degree of the gas measured inside the bathroom. In addition, when the inside of the bathroom has been cleaned using lox or the user has defecated, the bathroom managing apparatus can automatically deodorize the bathroom to provide a pleasant interior environment. In addition, it is possible to automatically manage a cycle or schedule for performing bathroom cleaning.

The effects of the present disclosure are not limited to the effects mentioned above, and other effects not mentioned can be clearly understood by those skilled in the art from the description of the claims.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The present disclosure has been made in view of the above problems, and provides a bathroom management system that automatically manages the inside of a bathroom according to a measured result by measuring temperature, relative humidity or gas inside and outside the bathroom.

The present disclosure further provides a bathroom management system that efficiently controls the inside of a bathroom by appropriately controlling a bathroom managing apparatus for heating, sterilizing or deodorizing a bathroom and an existing ventilation fan.

The problems of the present disclosure are not limited to the above-mentioned problems, and other problems not mentioned can be clearly understood by those skilled in the art from the following description.

In accordance with an aspect of the present disclosure, a bathroom managing system may include: a ventilation unit disposed in a bathroom to exhaust air inside the bathroom to the outside; a bathroom managing apparatus disposed inside the bathroom to heat, sterilize and deodorize the inside of the bathroom; and a switch disposed outside the bathroom to control the ventilation unit and communicate with the bathroom managing apparatus. The ventilation unit may be associated with the bathroom managing apparatus through the switch to automatically manage the inside of the bathroom.

In the bathroom managing system according to an aspect of the present disclosure, the switch measures an external temperature value of the bathroom which is a temperature outside the bathroom, and the bathroom managing apparatus measures an internal temperature value of the bathroom which is a temperature inside the bathroom. The bathroom managing apparatus may automatically heat the inside of the bathroom according to the external temperature value of the bathroom and the internal temperature value of the bathroom.

In the bathroom managing system according to an aspect of the present disclosure, the switch measures an external humidity value of the bathroom which is a relative humidity outside the bathroom, and the bathroom managing apparatus measures an internal humidity value of the bathroom which is a relative humidity inside the bathroom. The bathroom managing apparatus may automatically heat and sterilize the inside of the bathroom according to the external humidity value of the bathroom and the internal humidity value of the bathroom.

In the bathroom managing system according to an aspect of the present disclosure, the bathroom managing apparatus measures an internal humidity value of the bathroom which is a relative humidity inside the bathroom, and the ventilation unit may be operated or the bathroom managing apparatus may sterilize the inside of the bathroom according to the internal humidity value of the bathroom.

In the bathroom managing system according to an aspect of the present disclosure, the bathroom managing apparatus measures a bathroom gas value which is a degree of gas inside the bathroom, and the bathroom managing apparatus deodorize the inside of the bathroom according to the bathroom gas value.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A bathroom managing system, comprising:
    a ventilator disposed in a bathroom to exhaust air inside the bathroom to an outside location;
    a management assembly disposed inside the bathroom to heat, sterilize and deodorize the air inside of the bathroom, the management assembly including a heater; and
    a switch disposed outside the bathroom that controls the ventilator and communicates with the management assembly,
    wherein the switch measures an external temperature value of the bathroom which is a temperature outside the bathroom,
    wherein the management assembly measures an internal temperature value of the bathroom which is a temperature inside the bathroom, and
    wherein the management assembly heats the air inside of the bathroom when the external temperature value of the bathroom is less than a set temperature value and the internal temperature value of the bathroom is less than the external temperature value of the bathroom.

2. The bathroom managing system of claim 1, wherein the management assembly stops heating the bathroom when the internal temperature value of the bathroom is greater than the external temperature value of the bathroom.

3. The bathroom managing system of claim 1,
    wherein the switch further measures an external humidity value of the bathroom which is a relative humidity outside the bathroom,
    wherein the management assembly further measures an internal humidity value of the bathroom which is a relative humidity inside the bathroom, and
    wherein the management assembly heats and sterilizes air in the bathroom when a ratio of the internal humidity value to the external humidity value is not within a prescribed range.

4. The bathroom managing system of claim 3, wherein the switch includes a display configured to indicate that a door of the bathroom is opened when the ratio of the internal humidity value of the bathroom to the external humidity value of the bathroom is within the prescribed range.

5. The bathroom managing system of claim 1, wherein the management assembly further measures an internal humidity value of the bathroom which is a relative humidity inside the bathroom, and
    wherein the switch operates the ventilator and the bathroom managing apparatus further circulates air inside the bathroom when the internal humidity value of the bathroom is greater than a set humidity value.

6. The bathroom managing system of claim 5, wherein the switch operates the ventilator and the management assembly sterilizes air inside the bathroom when the internal humidity value of the bathroom is less than the set humidity value.

7. The bathroom managing system of claim 1, wherein the management assembly further measures a bathroom gas value which is a degree of gas inside the bathroom,
    wherein the switch operates the ventilator and the management assembly deodorizes the air inside the bathroom when the bathroom gas value is less than a first set value.

8. The bathroom managing system of claim 7, wherein the switch operates the ventilator and the management assembly deodorizes the air inside the bathroom when the bathroom gas value is greater than a second set value.

9. The bathroom managing system of claim 1, further comprising:
    a plug socket disposed inside the bathroom that accommodates an electrical plug of the management assembly; and
    a distribution board that supplies power to the ventilator and the plug socket,
    wherein the ventilator includes a plurality of power supply lines, one line among the power supply lines being connected to the distribution board and another line among the power supply lines being connected to the switch.

10. The bathroom managing system of claim 9, further comprising a bathroom lamp disposed inside the bathroom to produce light,
wherein the bathroom lamp includes a plurality of power supply lines, one line among the power supply lines for the bathroom lamp being connected to the distribution board and another line of the power supply lines for the bathroom lamp being connected to the switch.

11. The bathroom managing system of claim 1, wherein the switch displays the internal temperature value of the bathroom.

12. A bathroom managing system comprising:
a ventilator provided in a bathroom to exhaust air inside the bathroom outside of the bathroom;
a management assembly positioned inside the bathroom to heat, sterilize and deodorize the air inside of the bathroom; and
a switch positioned outside the bathroom to control the ventilator and communicate with the management assembly,
wherein the management assembly includes:
at least one case that forms an outer appearance of the management assembly, wherein the at least one case has an air inlet formed in an upper portion of the at least one case for air intake, and an air outlet formed in a lower portion of the at least one case to discharge air,
a blowing fan disposed inside the at least one case to circulate air,
a blowing fan motor to rotate the blowing fan,
a heater to heat air drawn into the air inlet,
a rack which is disposed in a lower surface of the at least one case and on which a towel can be hanged,
a suction vane rotatably coupled to the upper portion of the at least one case to open and close the air inlet; and
a discharge vane rotatably coupled to the lower portion of the at least one case to open and close the air outlet.

13. The bathroom managing system of claim 12, wherein the at least one case includes an outer case to form side and rear appearances, and an inner case to form a front appearance, wherein
the air inlet is formed in an upper portion of the inner case,
wherein the air outlet is formed in a lower portion of the inner case, and
the management assembly further includes:
a motor to rotate the suction vane and the discharge vane.

14. The bathroom managing system of claim 13, wherein the switch measures an external temperature value of the bathroom which is a temperature outside the bathroom and an external humidity value of the bathroom which is a relative humidity outside the bathroom,
wherein the management assembly measures an internal temperature value of the bathroom which is a temperature inside the bathroom and an internal humidity value of the bathroom which is a relative humidity inside the bathroom, and
wherein the management assembly operates the blowing fan motor, the heater, and the motor according to the external temperature value of the bathroom, the external humidity value of the bathroom, the internal temperature value of the bathroom, and the internal humidity value of the bathroom.

15. A bathroom managing apparatus, comprising:
a rear cover;
a front cover coupled to the rear cover;
a heater, a blowing fan, and an ionizer provided inside the front and rear covers;
a temperature sensor, a humidity sensor, and a gas sensor,
a controller that controls the heater, the blowing fan, and the ionizer to heat and deodorize air inside a bathroom; and
a communication unit in communication with an external control panel to control a ventilation fan provided in the bathroom to operate based on an operating state of the heater, the blowing fan, and the ionizer;
wherein the controller operates the heater to heat the bathroom when a temperature outside the bathroom is less than a preset temperature, and a temperature inside the bathroom is less than the temperature outside the bathroom, and
wherein the controller operates the blowing fan and the ionizer to deodorize the bathroom when an internal humidity inside the bathroom and an external humidity outside the bathroom are different from each other by a prescribed amount and when the ventilation fan is not operating.

16. The bathroom managing apparatus of claim 15, wherein when the internal humidity is greater than or equal to a prescribed humidity, the ventilation fan is operated to lower the internal humidity, and when the internal humidity is less than the prescribed humidity, the blower fan and the ionizer are operated to deodorize the bathroom.

17. The bathroom managing apparatus of claim 15, wherein when a gas value measured by the gas sensor in the bathroom is less than a first prescribed value, the controller sends information to the external control panel to display an indication that the bathroom has been cleaned, and when the gas value is greater than a second prescribed value, the controller determines that a prescribed odor is present in the bathroom.

18. The bathroom managing apparatus of claim 17, wherein when the gas value is less than the first prescribed value or greater than the second prescribed value, the controller controls the ventilation fan, the blowing fan, and the ionizer to ventilate and deodorize the bathroom.

* * * * *